United States Patent
Babik et al.

(10) Patent No.: US 12,012,533 B2
(45) Date of Patent: Jun. 18, 2024

(54) AMORPHOUS POLY-ALPHA-OLEFINS AND USE THEREOF IN HOT-MELT COMPOSITIONS HAVING IMPROVED SPRAYABILITY

(71) Applicant: Evonik Operations GmbH, Essen (DE)

(72) Inventors: Sebastian Babik, Düsseldorf (DE); Steffen Cepa, Marl (DE); André Ebbers, Bochum (DE); Klaus Behrendt, Haltern am See (DE); Jessica Vieth, Senden (DE); Katharina Rawert, Moers (DE); Gabriele Wrobel, Dorsten (DE)

(73) Assignee: Evonik Operations GmbH, Essen (DE)

( * ) Notice: Subject to any disclaimer, the term of this patent is extended or adjusted under 35 U.S.C. 154(b) by 682 days.

(21) Appl. No.: 17/271,948

(22) PCT Filed: Sep. 3, 2019

(86) PCT No.: PCT/EP2019/073433
§ 371 (c)(1),
(2) Date: Feb. 26, 2021

(87) PCT Pub. No.: WO2020/048959
PCT Pub. Date: Mar. 12, 2020

(65) Prior Publication Data
US 2021/0324239 A1    Oct. 21, 2021

(30) Foreign Application Priority Data
Sep. 6, 2018 (EP) .................................. 18192854

(51) Int. Cl.
*C09J 5/06* (2006.01)
*C08F 8/50* (2006.01)
(Continued)

(52) U.S. Cl.
CPC .................. *C09J 5/06* (2013.01); *C08F 8/50* (2013.01); *C08F 210/08* (2013.01); *C09J 4/00* (2013.01);
(Continued)

(58) Field of Classification Search
CPC ........ C08F 8/50; C08F 210/08; C08F 210/06; C08F 210/16; C08F 2500/17; C08F 2500/02
See application file for complete search history.

(56) References Cited

U.S. PATENT DOCUMENTS

| 3,121,070 A | 2/1964 | Coover, Jr. et al. |
| 3,940,379 A | 2/1976 | Castagna et al. |

(Continued)

FOREIGN PATENT DOCUMENTS

| CN | 1161195 A | 10/1997 |
| CN | 104926972 A | 9/2015 |

(Continued)

OTHER PUBLICATIONS

German language International Search Report mailed on Apr. 12, 2019 in PCT/EP2019/073433 (3 pages).

(Continued)

*Primary Examiner* — Michael M Dollinger
(74) *Attorney, Agent, or Firm* — Michael Best & Friedrich LLP

(57) ABSTRACT

The invention relates to amorphous poly-alpha-olefins, which are characterized in that said amorphous poly-alpha-olefins have a viscosity at 190° C. of less than 5000 mPas, a molar mass distribution (Mw/Mn) of 3 to 8, a quotient Mz/Mw of less than or equal to 3.0 and a quotient Mz/Mn of less than 21.0. The invention further relates to a method for producing degraded amorphous poly-alpha-olefins, in particular the amorphous poly-alpha-olefins according to the invention, and to the use of the amorphous polyalpha-olefins (Continued)

according to the invention or produced according to the invention in hot-melt adhesive compositions.

21 Claims, 4 Drawing Sheets

(51) Int. Cl.
    *C08F 210/08*    (2006.01)
    *C09J 4/00*       (2006.01)
    *C09J 123/02*    (2006.01)

(52) U.S. Cl.
    CPC ......... *C09J 123/02* (2013.01); *C09J 2423/00* (2013.01)

(56) References Cited

U.S. PATENT DOCUMENTS

| | | | |
|---|---|---|---|
| 4,707,524 A | 11/1987 | Ehrig et al. | |
| 4,734,448 A * | 3/1988 | Kasahara | C08F 8/50 524/505 |
| 4,833,209 A * | 5/1989 | Beijleveld | C08F 8/50 525/298 |
| 5,241,014 A | 8/1993 | Kehr et al. | |
| 5,763,333 A | 6/1998 | Suzuki et al. | |
| 6,124,513 A * | 9/2000 | Heilman | C10M 107/10 585/12 |
| 6,872,279 B1 | 3/2005 | Kolowrot et al. | |
| 8,765,851 B2 * | 7/2014 | Miller | C08L 51/06 524/275 |
| 8,921,474 B2 | 12/2014 | Alper et al. | |
| 9,267,060 B2 | 2/2016 | Davis et al. | |
| 2013/0005884 A1 | 1/2013 | Davis et al. | |
| 2014/0234645 A1 | 8/2014 | Davis et al. | |
| 2016/0222258 A1 | 8/2016 | Sustic et al. | |

FOREIGN PATENT DOCUMENTS

| | | |
|---|---|---|
| EP | 0 442 045 B1 | 10/1993 |
| EP | 1 124 911 B1 | 5/2004 |
| JP | 2004204011 A | 7/2004 |
| JP | 2004284575 A | 10/2004 |

OTHER PUBLICATIONS

International Search Report mailed on Apr. 12, 2019 in PCT/EP2019/073433 (2 pages).
Written Opinion mailed on Apr. 12, 2019 in PCT/EP2019/073433 (4 pages).
Notice of Reasons for Refusal for JP 2021-512251, published Feb. 3, 2023 (6 pages).
Chinese Patent Office Third Action for Application No. 201980058095.3 dated Apr. 2, 2024 (11 pages including English translation).

* cited by examiner

AMORPHOUS POLY-ALPHA-OLEFINS AND USE THEREOF IN HOT-MELT COMPOSITIONS HAVING IMPROVED SPRAYABILITY

CROSS REFERENCE TO RELATED APPLICATIONS

This application is a 35 U.S.C. § 371 U.S. national phase entry of International Application No. PCT/EP2019/073433 having an international filing date of Sep. 3, 2019, which claims the benefit of European Application No. 18192854.0 filed Sep. 6, 2018 both of which are incorporated herein by reference in its entirety.

FIELD

The present invention relates to amorphous poly-alpha olefins, which have a viscosity at 190° C. of less than 5000 mPa*s, a molar mass distribution (Mw/Mn) of 3 to 8, a quotient Mz/Mw of not more than 3.0 and a quotient Mz/Mn of less than 21.0, to a process for producing degraded amorphous poly-alpha-olefins, especially the amorphous poly-alpha-olefins according to the invention, and to the use of the amorphous poly-alpha-olefins according to the invention or produced in accordance with the invention in melt-applied adhesive compositions.

BACKGROUND

In the application of hotmelt adhesives, spray nozzles (spiral nozzle, signature nozzle, etc.) are used in many cases, in which the hotmelt formulation is sprayed onto the substrate as a melt by means of nozzles under pressure.

The problem with formulations containing amorphous poly-alpha-olefins (APAOs hereinafter) is that they have a much higher application temperature and lower quality of the spraying result compared to formulations based on SBS/SIS [styrene-butadiene-styrene block copolymers and styrene-isoprene-styrene block copolymers]. Specifically, SBS/SIS-based systems are applied at about 120° C. and give a very uniform spraying result. A disadvantage of this system is the high level of formulation with resin systems (often more than 40% by weight) and the odor nuisance resulting from the styrene-based raw materials. This is where the advantage of the APAO-based systems is apparent, which have to be less significantly formulated (<30% by weight of resins) and additionally also have lower odor nuisance.

However, a serious disadvantage is the distinctly higher application temperature of >140° C. compared to the SBS/SIS systems. For instance, EP 1442089 B1 describes the application of APAO and syndiotactic PP with spiral nozzles at >170° C.

U.S. Pat. No. 8,921,474 B2 describes, for example, the generally poor sprayability of APAO-based hotmelts, for which reason SBS- or rubber-based systems are used.

EP 0442045 B1 describes the use of hotmelt formulations at <200° C.

EP 1124911 B1 describes sprayable APAO systems at preferably 140-160° C., but adds 5% to 30% oil. US 20160222258 A1 proposes an APAO system formulated with SBS, in order to lower the processing temperature.

Recurrent demands from the application point of view are application temperatures of <130° C. when using signature nozzles. These have not been achievable to date for APAO systems.

SUMMARY

The problem addressed by the present invention was therefore that of providing APAO(s) or a melt-applied adhesive composition based on APAO(s) that do not have one or more of the disadvantages of the prior art.

It has been found that, surprisingly, amorphous poly-alpha-olefins that satisfy particular parameters can solve one or more of the problems mentioned.

DETAILED DESCRIPTION

The present invention therefore provides amorphous poly-alpha-olefins as claimed in the claims and described hereinafter which have the feature of a viscosity at 190° C. of less than 5000 mPas, a molar mass distribution (Mw/Mn) of 3 to 8, a quotient of Mz/Mw of not more than 3.0 and a quotient of Mz/Mn of less than 21.0.

The present invention likewise provides a process for producing a degraded amorphous poly-alpha-olefin, which is characterized in that the amorphous poly-alpha-olefin has been obtained by free-radical, preferably peroxidic, degradation of an amorphous poly-alpha-olefin that has a viscosity at 190° C. of not more than 5000 mPas, the degradation reaction being conducted over a period of 15 seconds to 1200 seconds. Processes for degrading polymers are known in principle. U.S. Pat. No. 4,707,524 A describes, for example, the degradation of polypropylene by mixing with a peroxide. U.S. Pat. No. 3,121,070 A describes the degradation of polypropylene at temperatures of 275 to 450° C. U.S. Pat. No. 3,940,379 A describes the degradation of polypropylene in the presence of oxygen or peroxides to obtain a polypropylene with a higher melt flow rate. Markus Gahleitner in Prog. Polym. Sci. 26 (2001) 895-944 gives a review of the melt rheology of polyolefins.

The present invention also provides for the use of APAOs according to the invention or APAOs produced in accordance with the invention in melt-applied adhesive compositions.

The use of the APAOs according to the invention in melt-applied adhesive compositions can reduce the spray temperature to 100° C. to 140° C.

The material therefore has less of a tendency to cracking (to breakdown or cleavage of the polymers).

The APAO according to the invention can be used at 120° C. in an identical formulation (without SBS/SIS or even oil) to that before and allows—as was previously impossible—a low use temperature with lower resin formulation and lower odor nuisance with a simultaneously excellent spraying result.

Owing to the lower spraying temperature, less energy has to be used to melt the melt-applied adhesive composition. Moreover, the substrate is less stressed by virtue of the lower temperature, or it is possible to use less thermally stable substrate material.

The spraying result of the melt-applied adhesive composition used in accordance with the invention is much more uniform, which is associated with more homogeneous application of the material. This leads to distinctly better peel values, i.e. the difficulty of separating the nonwoven substrates. Values of more than 2.2 N in a 25 mm strip were achieved here, whereas the values before were below 2.0 N (in each case determined to ASTM D1876).

A further advantage is the higher process stability. The avoidance of "angel hair"—hotmelt filaments that emerge from the nozzle in an undirected manner—extends the cleaning cycles and reduces the complexity of cleaning, which ultimately leads to more operating hours.

The melt-applied adhesive compositions based on the APAOs according to the invention can be used not just in spray nozzle methods but also in other methods, for example those in which slot dies are used.

The melt-applied adhesive compositions based on APAO according to the invention or APAO produced in accordance with the invention, by comparison with formulations based on metallocene-based systems, can be formulated with a much higher polymer level, which distinctly reduces the formulation complexity. Thus, on the basis of APAO according to the invention or APAO produced in accordance with the invention, it is possible to formulate with up to 70% by weight of polymer (APAO) or even more than 95% by weight, based on the melt-applied adhesive composition, whereas, in metallocene-based systems, it is often possible to use only max. 40% by weight of polymer (polyolefin), based on the overall formulation.

The APAOs according to the invention, the process according to the invention and the inventive use of the APAOs are described by way of example hereinafter, without any intention that the invention be restricted to these illustrative embodiments. Where ranges, general formulae or classes of compounds are specified hereinafter, these shall encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Where figures are given in percent hereinbelow, these are percentages by weight unless stated otherwise. Where averages, for example molar mass averages, are specified hereinafter, these are the numerical average unless stated otherwise. Where properties of a material are specified hereinafter, for example viscosities or the like, these are the properties of the material at 25° C., unless stated otherwise. Where chemical (empirical) formulae are used in the present invention, the specified indices may be not only absolute numbers but also average values. The indices relating to polymeric compounds are preferably average values.

The amorphous poly-alpha-olefin according to the invention is characterized in that it has a viscosity at 190° C. of less than 5000 mPas, preferably of 1000 to 4000 mPas, a molecular weight distribution (Mw/Mn) of 3 to 8, preferably of 4 to 7, a quotient of Mz/Mw of less than 3.5, preferably 1.1 to 2.9, and a quotient of Mz/Mn of less than 21.0, preferably 1.1 to 19.9.

Mw is the weight-average molecular weight, Mn the number-average molecular weight and Mz the centrifuge-average molecular weight. The molecular weights Mw, Mn and Mz are determined by means of HT-GPC [high-temperature gel permeation chromatography] as described in DIN 55 672. Specifically, analytical HT-GPC was conducted by means of a PL220 oven (Agilent, Waldbronn) with integrated isocratic pump at 150° C. The mobile phase used was 1,2,4-trichlorobenzene (TCB) (Merck, Darmstadt) spiked with ~1 g/L butylhydroxytoluene (BHT) with a flow rate of 1 ml/min, and the stationary phase used was one Agilent PLgel Olexis Guard (50×7.5 mm, precolumn) and three Agilent PLgel Olexis (300×7.5 mm). Detection was effected by means of an IR detector (model IR4, Polymer-Char, Valencia, Spain). The datasets were evaluated by means of a polystyrene calibration EasiCal PS-1, Agilent) by the software WinGPC (Polymer Standards Service, Mainz).

The viscosity was determined at 190° C. by measurements with a rotary viscometer analogously to DIN 53 019. The viscosity was determined at 190° C. by measurements with the CAP 2000+cone-plate viscometer from Brookfield with a viscosity-dependent shear rate analogously to the following table:

| Cone | Shear rate | Eta (at 10% utilization of the torque) | Eta (at 100% utilization of the torque) |
|------|-----------|----------------------------------------|------------------------------------------|
| 07   | 10 s-1    | 6300 mPas                              | 63 000 mPas                              |
| 08   | 10 s-1    | 25 000 mPas                            | 250 000 mPas                             |
| 07   | 30 s-1    | 2100 mPas                              | 21 000 mPas                              |

Calibration of the Brookfield viscometer was accomplished using a Newtonian standard sample of the 500000 BW type. This was sourced from the Zentrum für Messen and Kalibrieren & Analytik GMBH and issued with a corresponding calibration certificate.

The APAO is preferably a propene- or 1-butene-rich APAO. Preferred propene-rich APAO is based preferably to an extent of >50% by weight, preferably to an extent of 51% to 98% by weight, on propene as monomer, based on all monomers. In addition, the propene-rich APAO may include 1-butene and/or ethene, preferably 1-butene and ethene, as comonomers. The sum total of 1-butene and ethene here is <49% by weight, preferably with an ethene content of 0% to 25% by weight, preferably 1% to 15% by weight, based on all monomers. Preferred 1-butene-rich APAO is based preferably to an extent of >50% by weight, preferably to an extent of 51% to 98% by weight, on 1-butene as monomer, based on all monomers. In addition, the 1-butene-rich APAO may include propene and/or ethene, preferably propene and ethene, as comonomers. The sum total here of propene and ethene here is <49% by weight, preferably with an ethene content of 0% to 25% by weight, preferably 1% to 15% by weight, based on all monomers.

The amorphous poly-alpha-olefin according to the invention may advantageously include from 0.01% to 3% by weight of at least one antioxidant. Antioxidants used may be any substances known as antioxidants and/or inhibitors, i.e. substances that stop the propagation of a free-radical reaction. The amorphous poly-alpha-olefin according to the invention preferably contains sterically hindered amines, e.g. piperidine derivatives, preferably sterically hindered phenols, for example Irganox 1010, Naugard XL1, Songnox 1035. In this way, it is possible to prevent or reduce the degradation of the APAO and/or yellowing of the APAO.

The APAO according to the invention preferably includes from 0.01% to 3% by weight of at least one degradation product of a free-radical former. Preferably, the APAO according to the invention includes benzoic acid, methanol, butanol, tert-butanol, propionic acid and/or 2,5-dimethyl-hexan-2,5-ol as degradation product of a free-radical former.

The APAOs according to the invention can be prepared by the process according to the invention described hereinafter.

It is a feature of the process according to the invention for producing a degraded amorphous poly-alpha-olefin that an amorphous poly-alpha-olefin having a viscosity at 190° C. of not less than 5000 mPas, preferably 6000 to 100 000 mPas and more preferably of 7500 to 75 000 mPas is subjected to a free-radical, preferably peroxidic, degradation, the degradation reaction being conducted over a period of 15 seconds to 1200 seconds. The free-radical, preferably peroxidic, degradation is preferably conducted in a mixing apparatus, preferably in an extruder.

The APAO used is preferably a propene- or 1-butene-rich APAO. Preferred propene-rich APAO is based preferably to an extent of >50% by weight, preferably to an extent of 51% to 98% by weight, on propene as monomer, based on all monomers. In addition, the propene-rich APAO may include 1-butene and/or ethene, preferably 1-butene and ethene, as comonomers. The sum total of 1-butene and ethene here is <49% by weight, preferably with an ethene content of 0% to 25% by weight, preferably 1% to 15% by weight, based on all monomers. Preferred 1-butene-rich APAO is based preferably to an extent of >50% by weight, preferably to an extent of 51% to 98% by weight, on 1-butene as monomer, based on all monomers. In addition, the 1-butene-rich APAO may include propene and/or ethene, preferably propene and ethene, as comonomers.

The sum total of propene and ethene here is <49% by weight, preferably with an ethene content of 0% to 25% by weight, preferably 1% to 15% by weight, based on all monomers.

Preferably, the free-radical degradation is conducted in the presence of a free-radical former, preferably selected from dibenzoyl peroxide, tert-butyl peroxyisopropylcarbonate, 2,5-dimethyl-2,5-di(tert-butylperoxy)hexane, di-tert-butyl peroxide and/or, preferably or, p-methane hydroperoxide. The proportion of the free-radical formers used is preferably from 0.01% to 10% by weight, preferably from 0.1% to 5% by weight, based on the sum total of APAO and free-radical formers.

The degradation reaction in the process according to the invention is preferably conducted at a temperature of 100 to 350° C., preferably from 150 to 250° C. The degradation is preferably effected in the melt.

According to the reactivity and concentration of the free-radical former used, the degradation reaction is conducted preferably over a period of 30 seconds to 600 seconds.

The degradation reaction is preferably conducted over a period t of 15 seconds to 1200 seconds, preferably 30 seconds to 600 seconds, and at a temperature T of 100 to 350° C., preferably of 150 to 250° C., where the proportion A of free-radical formers used is from 0.01% to 10% by weight, preferably 0.1% to 5% by weight, based on the sum total of APAO and free-radical formers, with the proviso that the product of t×T×A is from 500 to 1 000 000 [sec ° C. % by wt.], preferably from 1000 to 100 000 [sec ° C. % by wt.].

The degradation reaction in the process according to the invention is preferably conducted in a mixing apparatus. Mixing apparatuses used are preferably extruders, kneaders or pressure reactors with stirrers. Particular preference is given to conducting the reaction in an extruder. Particular preference is given to conducting the degradation reaction in a mixing apparatus, preferably an extruder, using the periods of time, temperatures and proportions of free-radical formers that are specified above as preferred and especially as more preferred.

The process according to the invention is especially suitable for production of the APAOs according to the invention.

The APAO according to the invention or APAO produced in accordance with the invention can be used in any hotmelt application in which APAOs according to the prior art can also be used. More particularly, the APAOs according to the invention or APAOs produced in accordance with the invention are used in or as melt-applied adhesive compositions.

Preferably, these compositions include from 50% to 100% by weight, preferably at least 70% by weight and more preferably at least 90% by weight of the APAOs according to the invention or APAOs produced in accordance with the invention. Further constituents of the melt-applied adhesive composition may especially be a tackifier resin and/or a wax, especially a Fischer-Tropsch wax or polyethylene wax. Preferred melt-applied adhesive compositions include from 50% to 100% by weight of an APAO according to the invention or an APAO produced in accordance with the invention, 0% to 40% by weight of a tackifier resin, e.g. hydrogenated C5/C9 Escorez™ 5300, from Exxon Mobil Corporation, and 0% to 10% by weight of a Fisher-Tropsch or PE wax, for example Shell GTL Sarawax SX80.

The melt-applied adhesive composition can be applied by application by means of a spray nozzle, slot die, melt-applied adhesive gun or by melt casting, preferably by means of a spray nozzle. Particularly suitable coating systems with application units for spraying of the adhesive are, for example, those from Nordson Corporation (Nordson hereinafter) or ITW Dynatec GmbH (ITW hereinafter). Suitable nozzles are, for example, UNIVERSAL™ SIGNATURE™ nozzles or Controlled Fiberization from Nordson or comparable nozzles of the UFD™ type from ITW. Further possible nozzles are listed in Table A.

TABLE A

List of nozzles from Nordson and IWT

| Nozzle | Source | Production rate | Recommended adhesive viscosity (190° C.) |
| --- | --- | --- | --- |
| CF (Controlled Fiberization) | Nordson | 10-350 m/min | 4000-8000 mPa*s |
| SUMMIT | Nordson | 10-400 m/min | 1500-10000 mPa*s |
| Continuous Signature | Nordson | 10-650 m/min | 1000-3000 mPa*s |
| Intermittent Signature | Nordson | 10-650 m/min | 1000-6000 mPa*s |
| Control Coat | Nordson | 10-600 m/min | 1000-3000 mPa*s |
| UFD RF | ITW | up to 500 m/min | up to 6000 mPa*s |
| UFD Omega | ITW | up to 500 m/min | up to 6000 mPa*s |
| UFD HS RF | ITW | up to 650 m/min | 1000 to 6000 mPa*s |
| UFD HS Omega | ITW | up to 650 m/min | 1000 to 6000 mPa*s |
| UFD SCS | ITW | up to 650 m/min | 1000 to 15000 mPa*s |

The melt-applied adhesive composition can be used in accordance with the invention in the applications of packaging, preferably cardboard packaging or paper, building, especially timber-frame construction, carpet, woodworking, preferably profile sealing and edge gluing, automobile, preferably roofs, air filters or vehicle lamps, mattresses, bitumen, hygiene articles, preferably diapers or napkins.

As well as conventional hotmelt applications, the APAO according to the invention or APAO produced in accordance with the invention can also be used as additive to other nonpolar plastics, for example polypropylenes, polyethylenes and polybutenes.

These may be suitable as compatibilizers or else as carrier matrix for masterbatch applications in order to incorporate, for example, pigments, other additives or fibers.

Even without further elaboration it is assumed that a person skilled in the art will be able to utilize the description above to the greatest possible extent. The preferred embodiments and examples are therefore to be interpreted merely as a descriptive disclosure which is by no means limiting in any way whatsoever.

The subject-matter of the present invention is more particularly elucidated by FIG. 1 to FIG. 3, without any intention that the subject-matter of the present invention be restricted thereto.

FIG. 1 is a schematic representation of an apparatus with which the APAOs degraded used in accordance with the invention can be produced. The apparatus has at least one mixing apparatus M, a feed for pre-radical former R, a feed for APAO to be degraded A, optionally a means of applying a vacuum V. The product that leaves the mixing apparatus M as product is degraded APAO Ad.

Figure 3A:
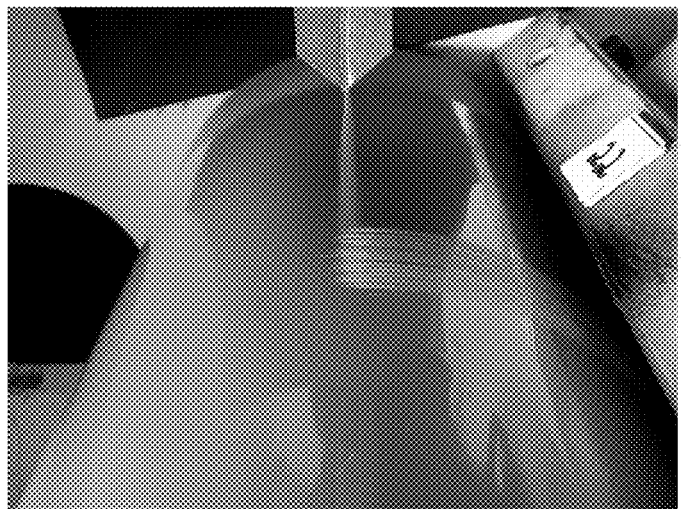
FIG. 3a depicts spraying onto a roll. From this viewing angle, it is very readily possible to determine the deflection of the spray filaments in and counter to coating direction.
Figure 3B:
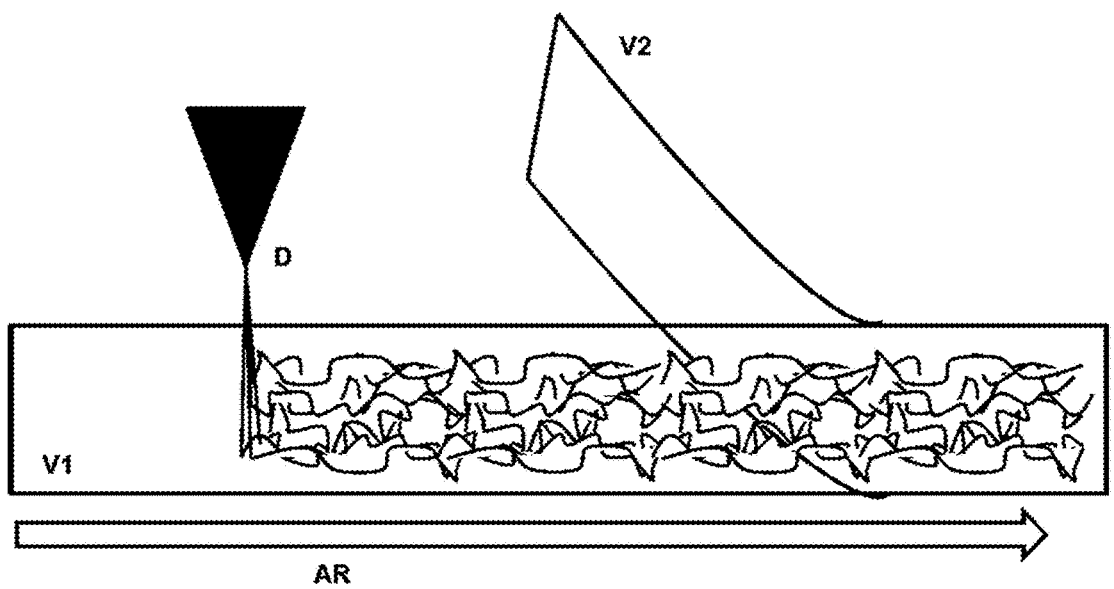

FIG. 3b is a schematic diagram of the spray application of the adhesive from nozzle D onto a nonwoven V1. AR denotes the application direction or advance of the nonwoven V1. A further nonwoven V2 is applied to the adhesive applied.

Figure 4A:
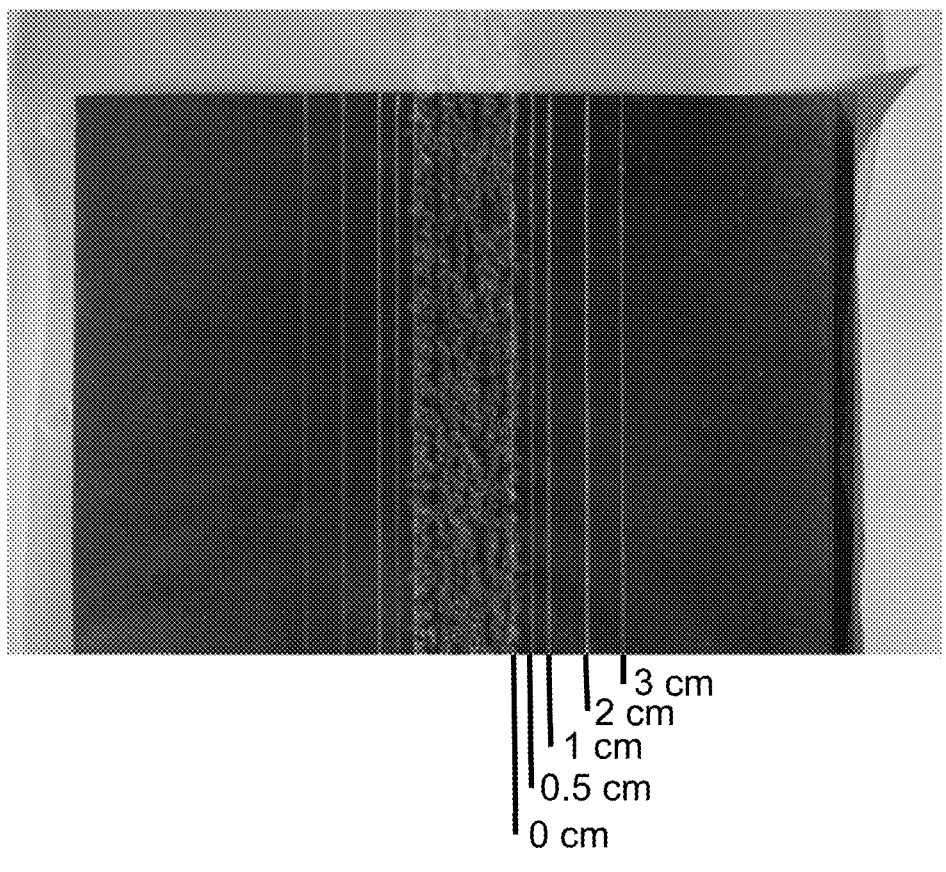

FIG. 4a depicts the spray template for quantification of the deflection, on which an application has been made. The template is a coated and counter-laminated substrate (polypropylene/polypropylene). The deflections of 0 cm, 0.5 cm, 1 cm, 2 cm and 3 cm correspond to classes 0, 0.5, 1, 2 and >2.

Figure 4B:
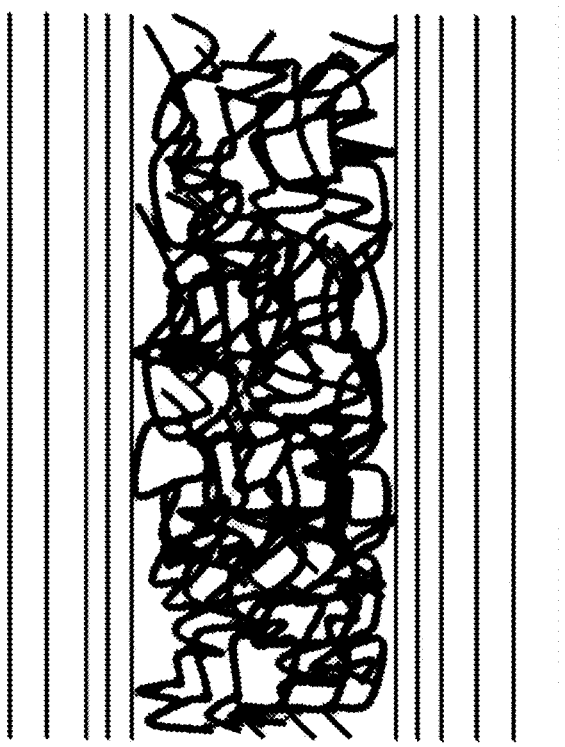

FIG. 4b is a schematic diagram of the spray template for quantification of the deflection.

The subject-matter of the present invention is elucidated in detail in the examples which follow, without any intention that the subject-matter of the present invention be restricted to these.

EXAMPLES

Example 1: Production of Degraded APAO in a Reactor with Stirrer 400 g of VESTOPLAST® 750, Evonik Resource Efficiency GmbH, are introduced into a laboratory pressure reactor with stirrer and heated up to 170° C. Once the temperature has been attained, 4% by weight (16 g) of the peroxide (Peroxan HX [2,5-dimethyl-2,5-di(tert-butylperoxy)hexane] from Pergan GmbH) is added and the mixture is stirred for 5 minutes. Subsequently, the mixture is discharged and the melt viscosity is determined at 190° C. on a Brookfield laboratory viscometer (see above for methods of determination). The viscosity of the mixture discharged at 190° C. was 4000 mPa*s. Determination of the viscosity at 190° C. of the VESTOPLAST® 750 used gave a value of ~50 000 mPa*s. GPC analysis gave the following values: Mz: 145100 [g/mol]; Mw: 60390 [g/mol]; Mn: 14180 [g/mol]; Mw/Mn: 4.3; Mz/Mw: 2.4; Mz/Mn: 10.2.

In the same way, first degradation experiments were conducted with a low-viscosity base polymer B1 (VESTOPLAST® EP V2094, off-spec, viscosity at 190° C.=7700 mPa*s) with different amounts of the peroxide and at different reaction temperatures. Table B shows the experimental parameters used and the properties measured. The properties of non-degraded VESTOPLAST® 408 (identified in the table as B2) and VESTOPLAST® 750 (identified in the table as B3) are for comparison.

TABLE B

Products used in Example 1, experimental parameters and product properties ascertained

| Base polymer | B1 | B1 | B1 | B1 | B1 | B2 | B3 |
|---|---|---|---|---|---|---|---|
| Viscosity [mPa*s] | 7700 | 5302 | 3636 | 4500 | 2761 | 8200 | 52500 |
| Peroxide [% by wt.] | 0 | 0.5 | 1.5 | 0.5 | 1.5 | 0 | 0 |
| Temperature [° C.] | 0 | 130 | 130 | 170 | 170 | 0 | 0 |
| Mn | 12700 | 10950 | 11350 | 10480 | 8350 | 12000 | 17890 |
| Mw | 74950 | 75800 | 69900 | 65450 | 57250 | 82800 | 149810 |
| Mz | 275500 | 312500 | 249500 | 198000 | 151500 | 388000 | 564600 |
| Mw/Mn | 5.9 | 6.9 | 6.2 | 6.2 | 6.9 | 6.9 | 8.4 |
| Mz/Mw | 3.7 | 4.1 | 3.6 | 3.0 | 2.6 | 4.7 | 3.8 |
| Mz/Mn | 21.7 | 28.5 | 22.0 | 18.9 | 18.1 | 32.3 | 31.6 |

As can be inferred from Table B, by degradation of amorphous poly-alpha-olefin having a viscosity at 190° C. of not less than 5000 mPa s by means of free-radical degradation, APAOs having the desired material/product properties are obtainable.

Example 2: Production of Degraded APAO on the Pilot Plant Scale in an Extruder

An initial charge of 20 kg of VESTOPLAST® 750 in the form of pellets was conveyed through a feed into a Bersdorf DSK42 extruder. At the same time, 1.8 kg/h of VESTOPLAST® 750 and about 200 g/h of a 50% by weight Peroxan PK295V [1,1-di-(tert-butylperoxy)-3,3,5-trimethylcyclohexane] from Pergan GmbH (mixture in isododecane) were metered in. The dwell time (reaction time) of the reaction mixture in the extruder is 30 seconds and the temperature in the extruder is 160° C. The viscosity of the mixture discharged at 190° C. was 2800 mPa*s. Mz: 149200 [g/mol]; Mw: 61110 [g/mol]; Mn: 14350 [g/mol]; Mw/Mn: 4.3; Mz/Mw: 2.4; Mz/Mn: 10.4.

Example 3: Production of Melt-Applied Adhesive Compositions

The polymers obtained in Example 2 were processed to give a melt-applied adhesive composition. For this purpose, the components specified in Table C below were mixed with one another at 190° C. by stirring.

TABLE C

| | Components used and, in brackets, % by mass of the components used for production of the melt-applied adhesive compositions | | |
|---|---|---|---|
| Example | APAO | Tackifier resin | Wax |
| 3a | From Example 2 (65) | Escorez™ 5380 (30) | Sarawax SX80 (5) |
| 3b | From Example 2 (100) | | |
| 3c | From Example 2 (70) | Escorez™ 5300 (30) | |

Example 4: Verification of Sprayability

For the verification of sprayability, test series were conducted with 14 experiments for each melt-applied adhesive formulation at three temperatures for examination (120° C., 140° C. and 160° C.). At the same time, parameters such as air pressure at the nozzle and mass of the melt-applied adhesive applied were varied, taking account of the application window of the nozzle used. The experiments were conducted with a Meltex Hot Melt Coater spraying system from Nordson (model designation: MX 3012-1/0220-2086). The nozzle used was a Low Flow Signature Nozzle from Nordson. The hotmelt formulation to be sprayed is melted in the tank at 190° C. and conveyed by means of a pump to the nozzle, where, using an air stream applied, the hotmelt formulation is deposited by means of a heated air stream at the nozzle exit onto the nonwoven substrate running past beneath the nozzle. A video recording for 10 seconds was made of each experiment. The experimental parameters varied can be found in Table 1.

Mass of the melt-applied adhesive applied: 0.5 to 10 g/m$^2$ [depending on pump speed and belt speed]
Speed of the substrate: 15 m/min
Pressure/air rate at the nozzle: 10 to 1301 (STP)/min per nozzle/1 to 4 bar

TABLE 1

| Experimental parameters used | | | | | | | | |
|---|---|---|---|---|---|---|---|---|
| Parameter | Abbreviation | Unit | Values | | | | | |
| Temperature of the melt-applied adhesive | T_nozzle | ° C. | 120 | 140 | 160 | | | |
| Air pressure at the nozzle | P | bar | 1 | 2 | 2.5 | 3 | 3.5 | 4 |
| Pump speed (digital display) | rpm_pump | % | 13 | 26 | 35 | 73 | 93 | |
| Distance of the nozzle from the substrate | d | cm | 4 | | | | | |
| Nozzle type | Nozzle | — | low flow signature nozzle | | | | | |

Assessment of the Spray Patterns

The spray patterns were assessed using the criteria described below. The results of the assessments are reported in Tables 2a to 2c.

Visual Impression of the Spray Pattern:
The visual impression of the spray pattern is to be assessed. This is a subjective assessment.

Figure 1:
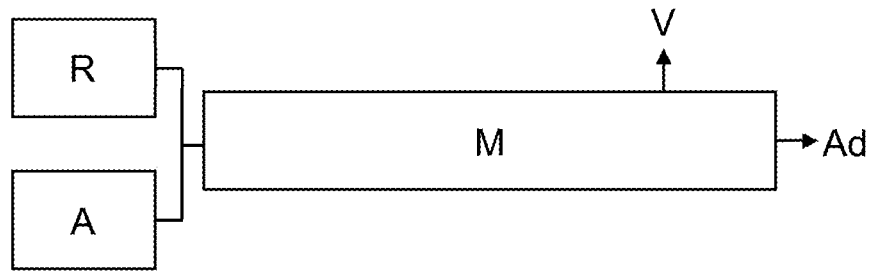
Figure 2A:
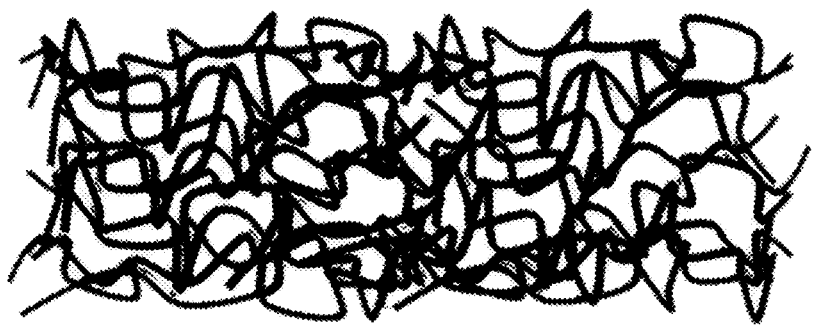
FIG. 2a shows an example of a nice spray pattern. It is clearly apparent that the pattern is regular and the filaments do not have any holes or drips.

In the case of a good spray pattern, the melt-applied adhesive constructs fine threads that exactly cover the region beneath the nozzle. No threads run to the left or right and the surface is covered with a regular pattern. FIG. 2a shows an example of a nice spray pattern.

Figure 2B:
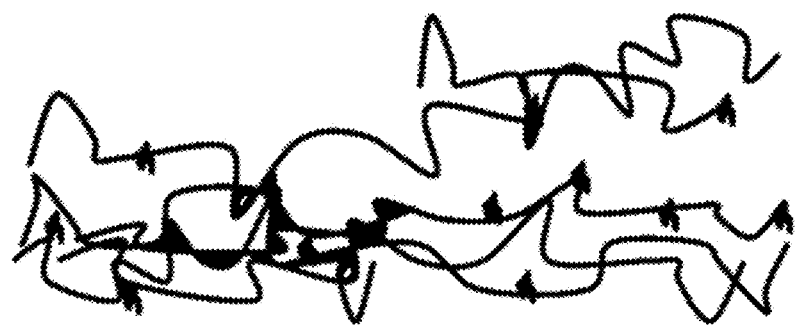
FIG. 2b shows an example of a poor spray pattern. It is clearly apparent that the pattern is irregular and the filaments have holes or drips.

In the case of a poor spray pattern, the melt-applied adhesive has been applied to the substrate in thick lines and/or dots. The filaments are broader than the nozzle and irregular. There may be large holes in the spray pattern, and parts of the substrate may not be covered with melt-applied adhesive. FIG. 2b shows an example of a poor spray pattern.

Assessment:
0=nice spray pattern
1=poor spray pattern

Edge Stability:
Edge stability relates to the stability of a straight line. Many holes in the line is a sign that the spray pattern does not have good edge stability. Individual outliers are neglected.

Assessment:
0=edge stability
1=no edge stability

Deflection of the Filaments (from the Template Mask):
The deflection relates to the areas of the spray pattern in which the threads lie outside the central marking of 2.5 cm (the deflection is determined only for the threads visible against the dark template mask).

Assessment:
0=no deflection
0.5=deflection of length up to 0.5 cm
1=deflection of length up to 1 cm
2=deflection of length up to 2 cm
3=deflection greater than a length of 2 cm Fine Filaments:
The deflection relates to the areas of the spray pattern in which very fine filaments lie outside the central marking of 2.5 cm (the fine filaments are virtually invisible against the dark template mask and can only be seen when the template mask is held against the light).

Assessment:
0=no deflection
0.5=deflection of length up to 0.5 cm
1=deflection of length up to 1 cm
2=deflection of length up to 2 cm
3=deflection greater than a length of 2 cm Evaluation of the Spray Videos:
Application Directly Beneath the Nozzle:
The application of the melt-applied adhesive is to take place directly beneath the nozzle. Any deviation to the left or right is undesirable. A template mask is used for evaluation.

Assessment:
0=The application of the melt-applied adhesive takes place directly beneath the nozzle in a straight line with a maximum deflection of 0.5 cm.
1=The filaments of the melt-applied adhesive do not even reach the substrate since they are too significantly deflected or the melt-applied adhesive filaments are deflected to such an extent that they do not reach the substrate in a straight line or do so with a deflection of more than 0.5 cm.

Deflection of Fine Filaments from the Template Mask or Formation of Angel Hair:
What is being described in this case is the deflection of the spray filaments in or counter to the direction of coating, considering only the spray width of 2.5 cm. If the application of 2.5 cm is exceeded or fine filaments fly over the substrate and do not reach it, this is referred to as angel hair.

Assessment:

0=no deflected filaments 0.5=filaments up to 0.5 cm deflected

1=filaments up to 1 cm deflected

2=filaments up to 2 cm deflected

3=filaments up to 3 cm deflected

4=filaments larger than 3 cm deflected

FIG. 3 depicts spraying onto a roll. From this viewing angle, it is very readily possible to determine the deflection of the spray filaments in and counter to coating direction.

Rating:

The rating represents the total number of points. The smaller the number, the better the sprayability.

Sprayability:

The fewer total points that are obtained in the evaluation, the better the sprayability of the melt-applied adhesive examined. 0 points means a sprayability of 100%, 11 points a sprayability of 0%.

Tables 2a to 2c show, by way of example, the evaluation of the 14 spray tests at 140° C. using the melt-applied adhesive composition according to Example 3a. Table 3 shows the sprayability in % for all melt-applied adhesive compositions tested.

TABLE 2a

Parameters and results of the assessment for experiments 1 to 5

| Parameter | 1 | 2 | 3 | 4 | 5 |
| --- | --- | --- | --- | --- | --- |
| Temperature in ° C. | 140 | 140 | 140 | 140 | 140 |
| Speed of the pump in % | 13 | 13 | 26 | 26 | 35 |
| Amount of melt-applied adhesive in g/min | 3.90 | 3.90 | 7.46 | 7.46 | 10.64 |
| Distance of nozzle from the substrate in cm | 4 | 4 | 4 | 4 | 4 |
| Air pressure on the nozzle in bar | 2 | 3 | 2 | 3 | 1 |
| Evaluation of the spray pattern | | | | | |
| Visual impression of the spray pattern | 1 | 1 | 0 | 0 | 0 |
| Edge stability | 0 | 0 | 0 | 0 | 0 |
| Deflection of the filaments (from the template mask) | 0 | 0 | 0 | 0 | 0 |
| Fine filaments | 0 | 0 | 0 | 0 | 0 |
| Evaluation of the video | | | | | |
| Application directly beneath the nozzle | 0 | 0 | 0 | 0 | 1 |
| Deflection of fine filaments from the template mask or formation of angel hair | 0 | 0 | 0.5 | 0.5 | 0.5 |
| Rating | 0 | 1 | 0.5 | 0.5 | 1.5 |
| Sprayability in % | 90.91 | 90.91 | 95.45 | 95.45 | 86.36 |

TABLE 2b

Parameters and results of the assessment for experiments 6 to 10

| Parameter | 6 | 7 | 8 | 9 | 10 |
| --- | --- | --- | --- | --- | --- |
| Temperature in ° C. | 140 | 140 | 140 | 140 | 140 |
| Speed of the pump in % | 35 | 35 | 35 | 35 | 35 |
| Amount of melt-applied adhesive in g/min | 10.64 | 10.64 | 10.64 | 10.64 | 10.64 |
| Distance of nozzle from the substrate in cm | 4 | 4 | 4 | 4 | 4 |
| Air pressure on the nozzle in bar | 2 | 2.5 | 3 | 3.5 | 4 |
| Evaluation of the spray pattern | | | | | |
| Visual impression of the spray pattern | 0 | 0 | 0 | 1 | 0 |
| Edge stability | 0 | 0 | 0 | 0 | 0 |
| Deflection of the filaments (from the template mask) | 0 | 0 | 0 | 0 | 0 |
| Fine filaments | 0 | 0 | 0 | 0 | 0 |
| Evaluation of the video | | | | | |
| Application directly beneath the nozzle | 1 | 1 | 1 | 1 | 0 |
| Deflection of fine filaments from the template mask or formation of angel hair | 0.5 | 0.5 | 0.5 | 1 | 1 |
| Rating | 1.5 | 1.5 | 1.5 | 2.5 | 1.5 |
| Sprayability in % | 86.36 | 86.36 | 86.36 | 77.27 | 86.36 |

TABLE 2c

Parameters and results of the assessment for experiments 11 to 14

| Parameter | 11 | 12 | 13 | 14 | Spr. |
|---|---|---|---|---|---|
| Temperature in ° C. | 140 | 140 | 140 | 140 | |
| Speed of the pump in % | 73 | 73 | 91 | 91 | |
| Amount of melt-applied adhesive in g/min | 22.91 | 22.91 | 28.27 | 28.27 | |
| Distance of nozzle from the substrate in cm | 4 | 4 | 4 | 4 | |
| Air pressure on the nozzle in bar | 2 | 3 | 2 | 3 | |
| Evaluation of the spray pattern | | | | | |
| Visual impression of the spray pattern | 0 | 0 | 0 | 0 | |
| Edge stability | 0 | 0 | 0 | 0 | |
| Deflection of the filaments (from the template mask) | 0 | 0 | 0 | 0 | |
| Fine filaments | 0 | 0 | 0 | 0 | |
| Evaluation of the video | | | | | |
| Application directly beneath the nozzle | 1 | 1 | 1 | 1 | |
| Deflection of fine filaments from the template mask or formation of angel hair | 1 | 0.5 | 1 | 1 | |
| Rating | 2 | 1.5 | 2 | 2 | 1.68 |
| Sprayability in % | 81.82 | 86.36 | 81.82 | 81.82 | 84.74 |

Spr.: sprayability

Table 3 shows the sprayability in % for all melt-applied adhesive compositions tested.

| Formulation | Temperature | Sprayability |
|---|---|---|
| 3a | 140° C. | 84.7% |
| 3a | 160° C. | 82.8% |
| 3b | 140° C. | 87.3% |
| 3b | 160° C. | 77.9% |
| 3c | 140° C. | 81.5% |
| 3c | 160° C. | 88.6% |

As can be inferred from Table 3, it was possible to assess the sprayability of an adhesive and/or the polymer using the detailed breakdown of the individual assessment criteria. Based on this method, it was possible to demonstrate that the sprayability of the degraded polymer has distinctly improved and a much larger application window, for example in relation to air pressure variation, temperature and application amount in g/min or g/m², could be achieved.

The invention claimed is:

1. An amorphous poly-alpha-olefin, wherein the amorphous poly-alpha-olefin has a Mz of 145100 g/mol to 249500 g/mol, a viscosity at 190° C. of less than 5000 mPas, a molecular weight distribution (Mw/Mn) of 3 to 8, a quotient of Mz/Mw of not more than 3.0, and a quotient of Mz/Mn of less than 21.0.

2. The amorphous poly-alpha-olefin of claim 1, wherein the amorphous poly-alpha-olefin includes from 0.01% to 3% by weight of at least one antioxidant.

3. The amorphous poly-alpha-olefin of claim 1, wherein the amorphous poly-alpha-olefin includes from 0.01% to 3% by weight of at least one degradation product of a free-radical initiator.

4. A process for producing a degraded amorphous poly-alpha-olefin having a Mz of 145100 g/mol to 249500 g/mol, wherein an amorphous poly-alpha-olefin having a viscosity at 190° C. of not less than 5000 mPas, is subjected to a free-radical degradation, the degradation reaction being conducted over a period of 15 seconds to 1200 seconds.

5. The process according to claim 4, wherein the free-radical degradation is conducted in an extruder.

6. The process according to claim 4, wherein the free-radical degradation is conducted in the presence of a free-radical former.

7. The process according to claim 6, wherein the proportion of the free-radical formers used is from 0.01% to 10% by weight, based on the sum-total of APAO and free-radical formers.

8. The process according to claim 4, wherein the degradation reaction is conducted at a temperature of 100 to 350° C.

9. The process according to claim 4, wherein the degradation reaction is conducted over a period of 30 seconds to 600 seconds.

10. The process according to claim 4, wherein the degradation reaction is conducted over a period t of 15 seconds to 1200 seconds, and at a temperature T of 100 to 350° C., where the proportion A of free-radical formers used is from 0.01% to 10% by weight, based on the sum total of APAO and free-radical formers.

11. The process according to claim 4, wherein the reaction is conducted in a mixing unit.

12. A hot melt adhesive composition comprising the APAO according to claim 1.

13. The hot melt adhesive composition according to claim 12, wherein the composition comprises at least 70% by weight, of amorphous poly-alpha-olefins.

14. The hot melt adhesive composition according to claim 12, wherein the melt-applied adhesive composition is applied by application by means of a spray nozzle, slot die, melt-applied adhesive gun or by melt casting.

15. The amorphous poly-alpha-olefin of claim 1, wherein the amorphous poly-alpha-olefin has a viscosity at 190° C. of from 1000 to 4000 mPas, a quotient of Mz/Mw of from 1.1 to 2.9, and a quotient of Mz/Mn of from 9.1 to 19.9.

16. The process according to claim 4, wherein an amorphous poly-alpha-olefin having a viscosity at 190° C. of from 6000 to 100 000 mPas is subjected to a free-radical degradation, the degradation reaction being conducted over a period of 15 seconds to 1200 seconds.

17. The process according to claim 4, wherein an amorphous poly-alpha-olefin having a viscosity at 190° C. of from 7500 to 75 000 mPas is subjected to a free-radical degradation, the degradation reaction being conducted over a period of 15 seconds to 1200 seconds.

18. The process according to claim 4, wherein the free-radical degradation is conducted in the presence of a free-radical former selected from the group consisting of dibenzoyl peroxide, tert-butyl peroxyisopropylcarbonate, 2,5-dimethyl-2,5-di(tert-butylperoxy)hexane, di-tert-butyl peroxide and p-methane hydroperoxide.

19. The process according to claim 4, wherein the free-radical degradation is peroxidic degradation.

20. The process according to claim 10, wherein the product of t×T×A is from 1000 to 100 000 [sec ° C. % by wt.].

21. The hot melt adhesive composition according to claim 14, wherein the melt-applied adhesive composition is applied by application by means of a spiral nozzle.

* * * * *